US007901576B2

(12) United States Patent
Stolarik et al.

(10) Patent No.: US 7,901,576 B2
(45) Date of Patent: Mar. 8, 2011

(54) COMPOSITE WATER TREATMENT VESSEL INCLUDING LIQUID DISTRIBUTOR PLATES

(75) Inventors: Douglas S. Stolarik, Concord Township, OH (US); Douglas M. Horner, Gates Mills, OH (US); Michael P. Mormino, Aurora, OH (US); Richard A. Mest, Phoenixville, PA (US)

(73) Assignee: Enpress, L.L.C., Eastlake, OH (US)

( * ) Notice: Subject to any disclaimer, the term of this patent is extended or adjusted under 35 U.S.C. 154(b) by 753 days.

(21) Appl. No.: 11/834,151

(22) Filed: Aug. 6, 2007

(65) Prior Publication Data

US 2009/0039009 A1 Feb. 12, 2009

(51) Int. Cl.
*B01D 24/12* (2006.01)
*B01D 24/46* (2006.01)

(52) U.S. Cl. ......... 210/279; 210/284; 210/288; 210/289; 210/293

(58) Field of Classification Search .................. 210/275, 210/281, 283, 284, 288, 289, 291, 304, 456, 210/498, 512.1, 279, 293
See application file for complete search history.

(56) References Cited

U.S. PATENT DOCUMENTS

| | | | |
|---|---|---|---|
| 3,534,856 A | | 10/1970 | Marsh |
| 3,557,827 A | | 1/1971 | Marsh |
| 3,653,845 A | * | 4/1972 | Moravec ....................... 422/311 |
| 3,662,780 A | | 5/1972 | Marsh |
| 4,228,000 A | | 10/1980 | Hoeschler |
| 5,089,140 A | | 2/1992 | Brane et al. |
| 5,147,530 A | | 9/1992 | Chandler et al. |
| 5,157,979 A | | 10/1992 | Brane et al. |
| 5,378,370 A | | 1/1995 | Brane et al. |
| 6,887,373 B2 | | 5/2005 | McCoy |
| 7,025,880 B2 | | 4/2006 | Lamb |
| 7,413,649 B2 | * | 8/2008 | Bittner .......................... 210/108 |
| 2003/0136720 A1 | | 7/2003 | Lamb |
| 2006/0060289 A1 | | 3/2006 | Carter et al. |

FOREIGN PATENT DOCUMENTS

| | | |
|---|---|---|
| DE | 1945659 A1 | 3/1973 |
| WO | 00/66264 | 11/2000 |
| WO | 03/031860 A1 | 4/2003 |

* cited by examiner

*Primary Examiner* — Matthew O Savage
(74) *Attorney, Agent, or Firm* — Rankin, Hill & Clark LLP

(57) ABSTRACT

The present invention provides: a distributor plate for a composite pressure vessel. The distributor plate includes a thermoplastic polymeric disk having a top side, a bottom side, a perimeter edge and a central opening. Radial slits are formed in the disk to define fluid flow passages through the disk between the central opening and the perimeter edge. The fluid flow passages through the disk are adapted to swirl fluid flowing through the disk from the bottom side to the top side around the central opening. The present invention also provides a water treatment vessel that includes one or more distributor plates, a method for manufacturing a composite pressure vessel that includes one or more of the distributor plates and a method for preparing a composite pressure vessel that includes one or more of the distributor plate for use as a water treatment apparatus.

20 Claims, 8 Drawing Sheets

FIG. 1
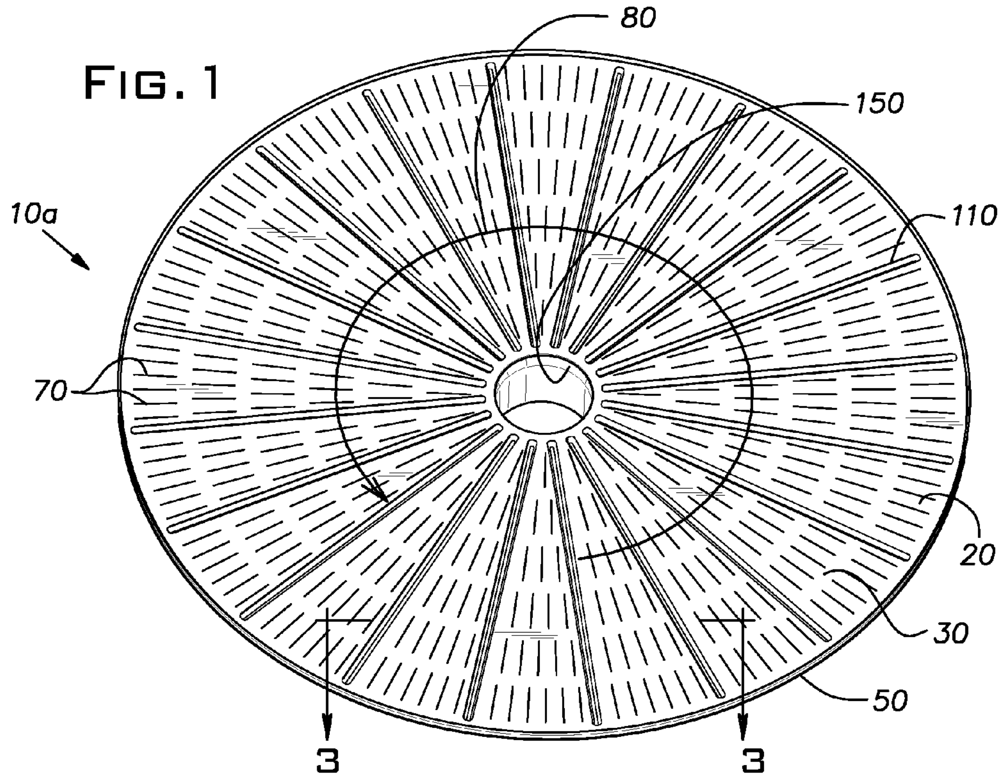
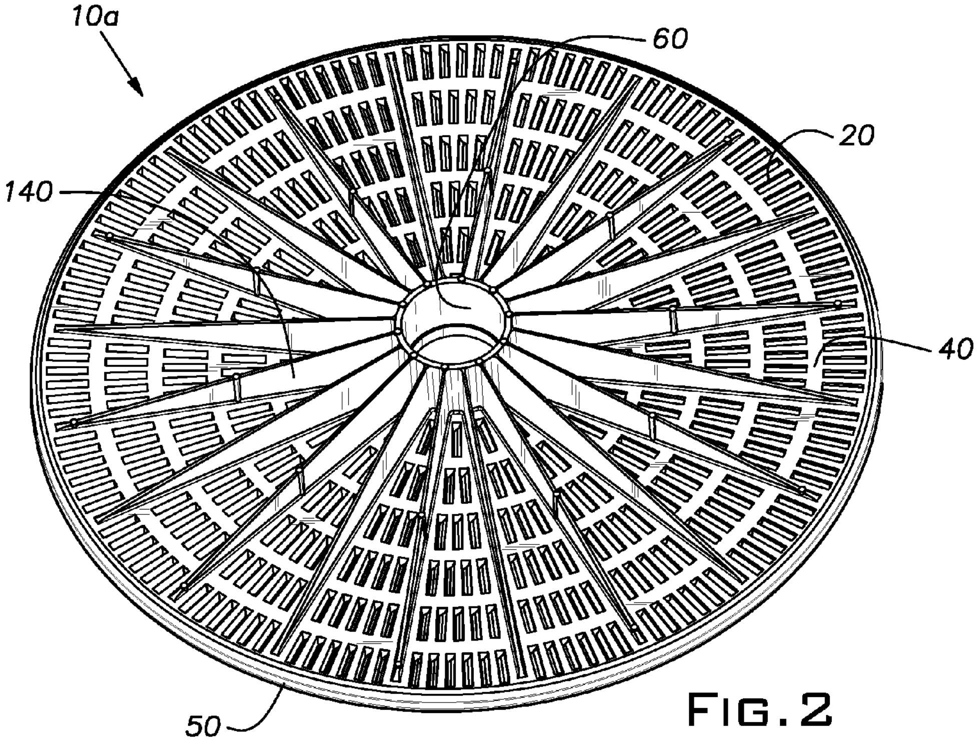
FIG. 2

COMPOSITE WATER TREATMENT VESSEL INCLUDING LIQUID DISTRIBUTOR PLATES

BACKGROUND OF INVENTION

1. Field of Invention

The present invention relates to distributor plates for composite pressure vessels, composite pressure vessels that include one or more of the distributor plates, methods for manufacturing composite pressure vessels that include one or more of the distributor plates and methods for preparing composite pressure vessels that include one of more of the distributor plates for use in water treatment applications.

2. Description of Related Art

Composite pressure vessels are used in a variety of applications including, for example, in the treatment and/or conditioning of water (e.g., water softeners). Composite pressure vessels used in such applications typically comprise an elongate thermoplastic liner or tank that has been over-wrapped with a reinforcing layer. The elongate thermoplastic liner is typically formed of one or more olefin polymers such as polypropylene and/or polyethylene, and is fabricated into a tank structure using a blow molding, rotational molding, spin welding or other thermoplastic fabrication process. The reinforcing layer typically comprises glass filaments that are wrapped helically and circumferentially around the thermoplastic liner. The glass filaments are typically consolidated together and adhered to the thermoplastic liner using a thermosetting epoxy composition but, as disclosed in Carter et al., Pub. No. US 2006/0060289 A1, can be consolidated and adhered to the thermoplastic liner using commingled thermoplastic fibers.

In many prior art water treatment system applications, a dip tube (also sometimes referred to in the art as a distributor pipe or a supply pipe) having a distributor basket attached at one end is inserted through an aperture in a top end of the composite pressure vessel such that the distributor basket is disposed proximal to the bottom end of the composite pressure vessel. Examples of water treatment systems of this type are disclosed in Hoeschler, U.S. Pat. No. 4,228,000, Chandler et al., U.S. Pat. No. 5,147,530 and McCoy, U.S. Pat. No. 6,887,373 B2. The distributor basket in such prior art devices generally includes a plurality of narrow slits, which allow water that has flowed through water treatment media disposed in the composite pressure vessel and thereby treated to flow out of the pressure vessel through the dip tube. The slits are dimensioned to prevent water treatment media from flowing into the dip tube with the treated water. During initial assembly of such devices, once the dip tube is properly positioned within the composite pressure vessel, water treatment media is placed into the composite pressure vessel to surround the distributor basket and dip tube and hold it in position. The open end of the dip tube is then attached to a valve assembly, which is secured to the top end of the composite pressure vessel to seal off the aperture. Water to be treated is pumped into the top of the composite pressure vessel, where it flows through the water treatment media and is thereby treated. The treated water flows from the water treatment media to the distributor basket, where it passes through the slits in the distributor basket and back out of the composite pressure vessel through the dip tube to the valve assembly coupled thereto. Periodically, the flow of water is reversed to back wash and thereby condition the water treatment media.

Occasionally, it is necessary to service a composite pressure vessel (e.g., to add new water treatment media). In many cases, removal of the valve assembly disturbs the position of the dip tube. Water treatment media can settle beneath the disturbed distributor basket, making it difficult to re-secure the valve assembly to the top end of the composite pressure vessel and thus close the aperture. When this occurs, water is usually pumped at high pressure through the dip tube to flush the water treatment media away from the distributor basket until the dip tube can be properly repositioned in the water treatment media. Water pumped into the opened composite pressure vessel during this procedure flows out of the composite pressure vessel and onto the floor, where it creates a mess that can cause damage to the building structure in which the composite pressure vessel is installed. It also disturbs the water treatment media within the composite pressure vessel, which can adversely affect future water treatment performance.

Carter et al., Pub. No. US 2006/0060289 A1, discloses a composite pressure vessel that utilizes one or more distributor plates (sometimes referred to therein as separators and/or fluid diffusers) instead of a distributor basket to prevent water treatment media from flowing into the dip tube during water treatment operations. The distributor plates divide the pressure vessel into regions and support the water treatment media within the composite pressure vessel. The distributor plates can be welded to the thermoplastic liner of the composite pressure vessel or can be mechanically fixed to structures within the interior of the composite pressure vessel. Prior art distributor plates have generally utilized mesh screens to prevent water treatment media from flowing through the distributor plate.

BRIEF SUMMARY OF THE INVENTION

The present invention provides a distributor plate for a composite pressure vessel that comprises a thermoplastic polymeric disk having a top side, a bottom side, a perimeter edge and a central opening. The disk is provided with a plurality of radial slits, which define fluid flow passages through the disk between the central opening and the perimeter edge. The fluid flow passages through the disk are adapted to swirl fluid flowing through the disk from the bottom side to the top side such that it swirls around the central opening.

In one embodiment of the invention, the perimeter edge of the distributor plate is secured to a first thermoplastic domed end cap of a thermoplastic liner assembly. A supply pipe having a snap fitting attached at one end is engaged with and retained by an upper retaining ring at the central opening of the disk. The distributor plate can be used to support water treatment media. During water treatment operations, water flows through the water treatment media and through the disk from the top side to the bottom side. The radial slits in the disk promote near-fractal distribution of the water through the water treatment media. During backwashing operations, water pumped through the supply pipe diffuses through the radial slits in the distributor plate from the bottom side to the top side. The distributor plate causes the backwash water to swirl around the central opening and the supply pipe secured thereto. The swirling action of the backwash water through the water treatment media ensures that the backwashing water makes optimal contact with the water treatment media, thereby conditioning all of the water treatment media and ensuring that it remains properly distributed within the composite pressure vessel.

In another embodiment of the invention, one or more second distributor plates are secured to the cylindrical side walls of the thermoplastic liner of the composite pressure vessel. The second distributor plates can support a water treatment media that is different in composition than the water treatment media supported by the first distributor plate. In addition, the present invention also provides methods for manufacturing composite pressure vessels that include one or more distributor plates and methods for preparing composite pressure vessels that include one or more distributor plates for use in water treatment applications.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

FIG. 1 is a perspective view showing a top side of an exemplary distributor plate according to the present invention.

FIG. 2 is a perspective view showing a bottom side of the distributor plate shown in FIG. 1.

DETAILED DESCRIPTION OF THE INVENTION

Figure 3:
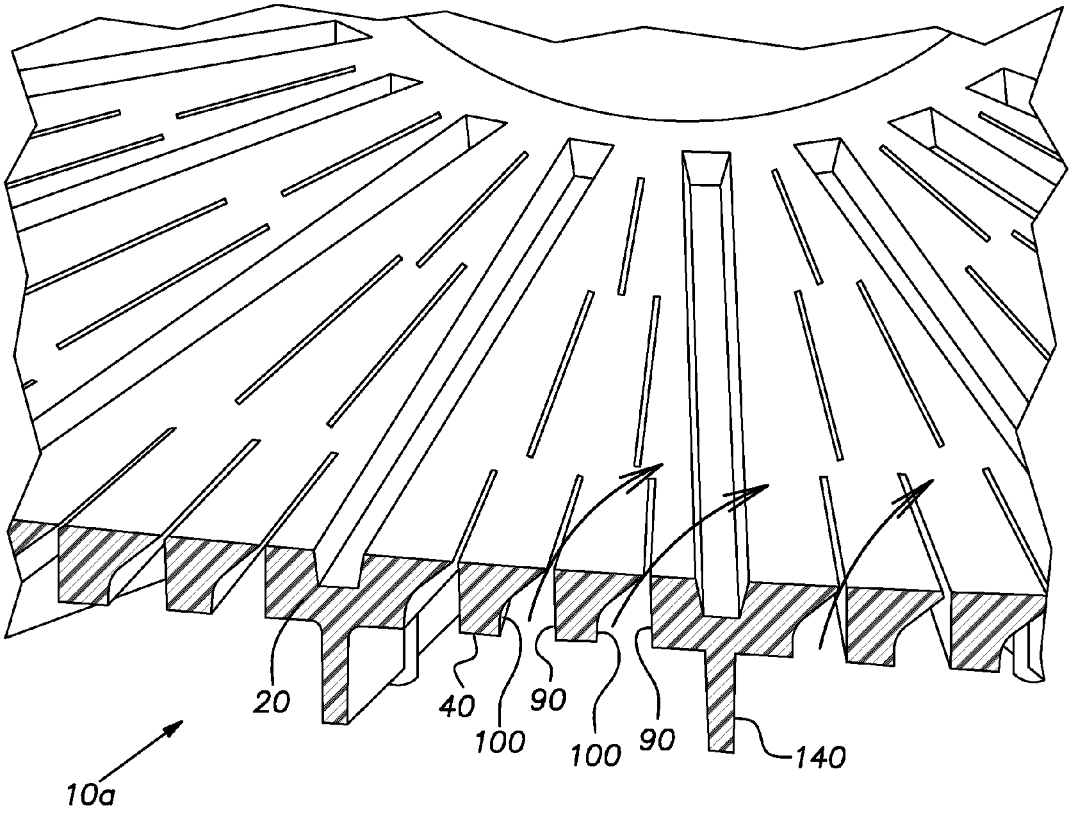
FIG. 3 is an enlarged section view of a portion of the distributor plate shown in FIG. 1 taken along the line III-III.

FIGS. 1-3 show views of an exemplary distributor plate 10*a* for a composite pressure vessel according to the invention. The distributor plate 10*a* comprises a thermoplastic polymeric disk 20 having a top side 30, a bottom side 40, a perimeter edge 50 and a central opening 60. Radial slits 70 are formed in the disk 20 to define fluid flow passages through the disk 20 between the central opening 60 and the perimeter edge 50. The radial slits 70 are most preferably arranged in a plurality of concentric rings around the circumference of the central opening 60, although other arrangements of the radial slits 70 can be used. The width of the radial slits 70 at the top side 30 of the disk 20 is not per se critical, but will be selected in view of the size of the water treatment media to be supported on the distributor plate 10*a*. Radial slits 70 having a width at the top side 30 of the disk 20 of about 0.006" (0.15 mm) are presently preferred for use in water treatment vessel applications.

The top side 30 of the distributor plate is adapted to support water treatment media thereon. During water treatment operations, water flows through the water treatment media and then through the disk 20 from the top side 30 to the bottom side 40 through the radial slits 70. The radial slits 70 are distributed around the central opening 60 in the disk 20 in such a way that the water being treated generally flows in a straight line downwardly through the bulk of water treatment media supported by the top side 30 of the disk 20 before it passes through the radial slits 70. The radial slits 70 in the disk 20 promote near-fractal distribution of the water through the water treatment media. This prevents "coning", which is a problem in many prior art water treatment vessels. The term "coning" refers to the path water being treated in conventional water treatment vessels tends to take through the water treatment media toward the distributor basket attached to the end of the dip tube. "Coning" is disadvantageous because only a portion of the water treatment media is used to treat the water. Distributor plates according to the invention eliminate "coning" and provide substantial improvements (typically >15%) in water treatment media bed life.

The fluid flow passages through the disk 20 are also adapted to swirl fluid flowing through the disk from the bottom side 40 to the top side 30 around the central opening 60, such as indicated by the large flow arrows 80 in FIGS. 2 and 3. As shown in FIG. 2, the fluid is preferably swirled around the central opening 60 in a counter-clockwise direction. This is highly advantageous during backwashing operations in which backwashing fluid is pumped through the supply pipe to flow upwardly through the water treatment media, thereby reconditioning the water treatment media. The backwashing fluid flows evenly through the radial slits 70 and through the entire bulk of the water treatment media supported by the top side 30 of the disk. The swirling action of the water improves backwashing efficiency and further serves to reduce the likelihood of "coning".

The improvements in backwashing efficiency provide significant benefits in water treatment applications. In conventional water treatment applications (e.g., water softeners), a backwash flow rate of about 3 gallons of water per minute is typically required for a period of about 20 minutes in order to recondition the water treatment media. This results in about 60 gallons of regenerative chemical and salt-laden backwash water being discharged into a municipal sewer system or a septic system each time the water treatment media is reconditioned. The backwashing efficiency provided by the present invention permits a much lower backwashing flow rate to be used (e.g., about 1.5 gallons per minute) over the same period, which significantly reduces the amount of regenerative chemical and salt-laden backwash water discharged from the system during backwashing operations. It also reduces the amount of regenerative chemicals that must be used during the backwashing operations, and the amount of salt that is lost during backwashing operations. Over the lifetime of the water treatment apparatus, the present invention can save tens of thousands of gallons of water and significant quantities of regenerative chemicals and salt from being discharged into the environment as compared to conventional water treatment devices.

The diameter of the distributor plate 10*a* is also not per se critical, but will be selected in view of the diameter of a domed end cap and/or an inner diameter of the cylindrical side wall of the composite pressure vessel to which the distributor plate 10*a* will be fused. The disk 20 should have a thickness sufficient to support water treatment media without deforming. It will be appreciated that composite pressure vessels having a larger diameter will generally need a thicker disk 20 than vessels having a smaller diameter. For most water treatment applications, a thickness of about 0.2" (5 mm) is considered sufficient.

There are several ways in which fluid flowing through the fluid flow passages in the disk 20 from the bottom side 40 to the top side 30 can be encouraged to swirl around the central portion 60 of the distributor plate 10*a*. For example, the fluid flow passages can have the same width as they pass through the thickness dimension of the disk 20, but be made to pass through the disk 20 at an angle other than a right angle with respect to the top side 30 (not shown). However, in view of the preferred very narrow width of the radial slit 70 openings in the top side 30 of the disk 20, this is not preferred.

More preferably, each of the radial slits 70 that define a fluid flow passage through the disk 20 is narrower in width at the top side 30 of the disk 20 than at the bottom side 40 of the disk 20. Thus, each of the fluid flow passages through the disk 20 is bounded by a first longitudinal sidewall 90 and a second longitudinal sidewall 100. The first longitudinal sidewall 90 is preferably substantially perpendicular to the top side 30 of the disk 20. However, the second longitudinal sidewall 100 has a concave profile in cross-section. As fluid is pumped through the fluid flow passages in the disk 20, the fluid follows along the contour of the concave second longitudinal sidewall 100 at a higher rate of speed that water flowing along the first longitudinal sidewall 90, thus causing the water to exit through the radial slit 70 at the top side 30 of the disk 20 in a direction other than perpendicular to the top side 30 of the disk 20. Because the radial slits 70 are arranged circumferentially around the disk 20, the radial slits 70 collectively serve to impart a swirling motion to fluid flowing through the fluid flow passages in the disk 20.

It will be appreciated that the second longitudinal sidewall 100 need not have a concave profile in cross-section, as illustrated in FIG. 3. Alternatively, the second longitudinal sidewall could have a planar profile in cross-section, which is angled with respect to the first longitudinal sidewall 90. Alternatively, the second longitudinal sidewall could have a convex profile in cross-section. But, a concave profile in cross-section is preferred.

Preferably, the top side 30 of the disk 20 is provided with a plurality of drive lugs 110, which are adapted to engage with fins extending from the face of a chuck of a spin-welding machine (not shown). The fins of the chuck extend into the drive lugs 110 when the disk is pressed thereon. The fins grip the drive lugs 110, allowing the distributor plate 10*a* to be temporarily rotated at high speed while the perimeter edge 50 is in frictional contact with an inner side of a thermoplastic domed end cap 120 (shown in FIG. 7) before the thermoplastic domed end cap 120 is spin-welded to the end of a thermoplastic cylinder 130 (shown in FIG. 7). The temporary high speed rotation and frictional contact between the perimeter 50 of the disk 20 and the inner side of thermoplastic domed end cap 120 causes the perimeter 50 of the disk 20 to rapidly heat up, melt and fuse the perimeter 50 of the disk 20 to the inner side of a thermoplastic domed end cap 120. Ideally, the perimeter edge 50 of the disk 20 should have a profile adapted to maximize fusion between the two surfaces during spin-welding.

In a preferred embodiment of the invention, the distributor plate 10*a* further comprises a plurality of radial reinforcing fins 140, which extend from the bottom side 40 of the disk 20 between the perimeter edge 50 and the central opening 60 through the disk 20. The central opening 60 through the disk 20 is preferably bounded by a collar having a height that is greater than the thickness dimension of the disk 20 at the perimeter edge 50. Thus, the radial reinforcing fins 140 attached to an outer side of the collar taper as they extend from the collar toward the perimeter edge 50.

Figure 4:
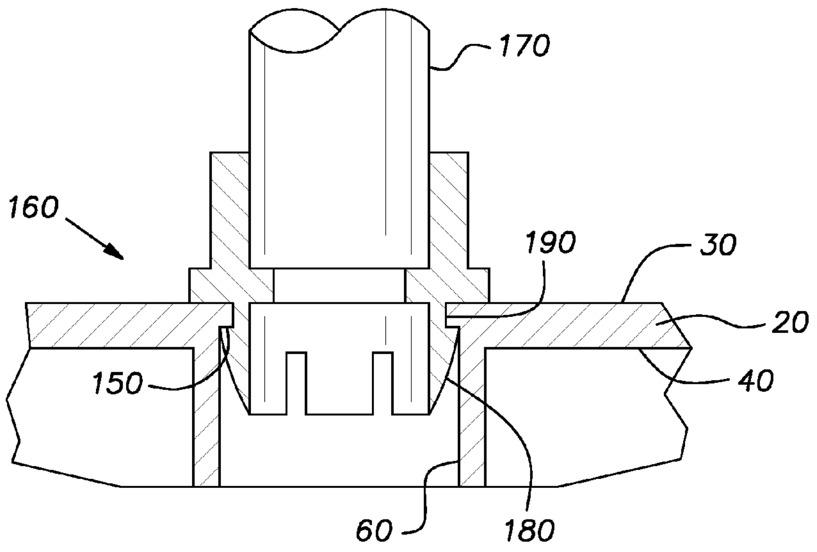
FIG. 4 is a front section view taken through the center of a snap fitting according to the invention engaged with an upper retaining ring of a distributor plate.
Figure 7:
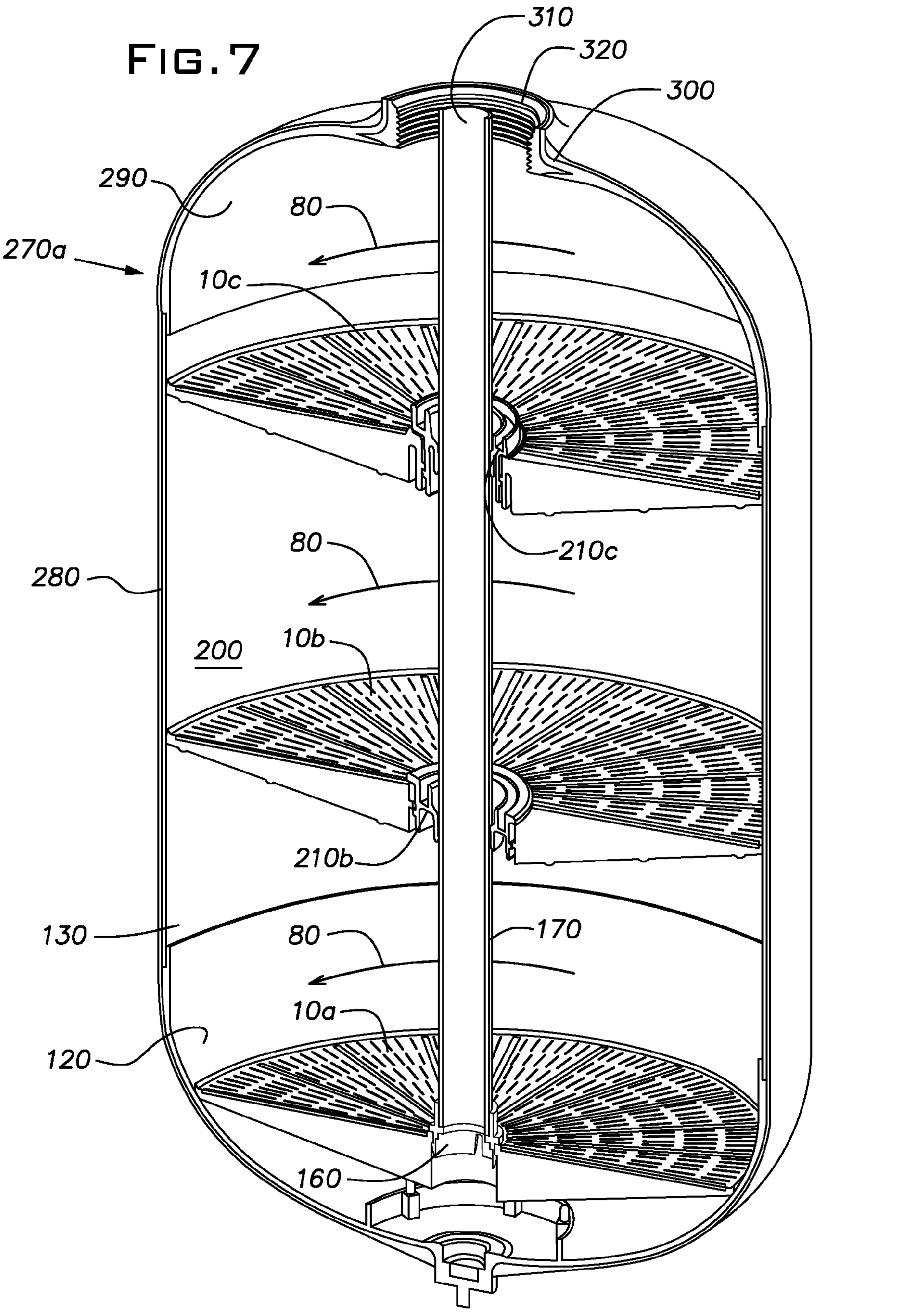
FIG. 7 is a perspective view showing the front of a section taken through the longitudinal axis of an exemplary composite pressure vessel according to the invention.

An upper retaining ring 150 is preferably provided about the central opening 60 for engaging a snap-fitting 160 (shown in FIG. 4) attached to an end of a supply pipe 170 (shown in FIG. 7). The snap-fitting 160 includes a plurality of deflectable tabs 180, which deflect inwardly as the snap-fitting 160 is pressed into the central opening 60 in the disk 20. The deflectable tabs 180 are biased to spring back after they pass the upper retaining ring 150, thereby capturing the upper retaining ring 160 in a channel 190 formed in the snap-fitting 160. Engagement of the snap-fitting to the disk 20 is substantially permanent. It takes more force to withdrawn the snap-fitting 160 from the disk 20 than is customarily applied to the supply pipe 170 during servicing of the composite pressure vessel. Thus, composite pressure vessels can be serviced without concern that the supply pipe 170 will become dislodged or otherwise displaced with respect to the disk 20.

In some applications, it may be desirable to spin-weld one or more second distributor plates 10*b*, 10*c* (etc.) to an inner side wall 200 of a thermoplastic cylinder 130 (see FIG. 7) above the first distributor plate 10*a* (or in place of the first distributor plate 10*a*). The second distributor plates 10*b*, 10*c* (etc.) can also be used to support water treatment media, which may be the same or different than the water treatment media supported by the first distributor plate 10*a*. Compartmental separation of different types of water treatment media can improve their performance and service life.

The second distributor plates 10*b*, 10*c* (etc.) preferably have the same general features and characteristics as the first distributor plate 10*a* described above. In other words, they comprise thermoplastic polymeric disks 20 having a top side 30, a bottom side 40, a perimeter edge 50 and a central opening 60, which are provided with radial slits 70 that define fluid flow passages through the disk 20 between the central opening 60 and the perimeter edge 50. One difference, however, is that the diameter of the central opening in the second distributor plates 10*b*, 10*c* (etc.) must be sufficiently larger in diameter than the diameter of the supply pipe 170 in order to facilitate disposing water treatment media past the second distributor plates 10*b*, 10*c* (etc.) to the be supported by the first distributor plate 10*a* (and/or lower second distributor plates). Once the water treatment media has passed the second distributor plates 10*b*, 10*c* (etc.), an access plate can be installed to close the gap or open space between the supply pipe 170 and the central opening in the second distributor plates 10*b*, 10*c* (etc.).

Figure 5:
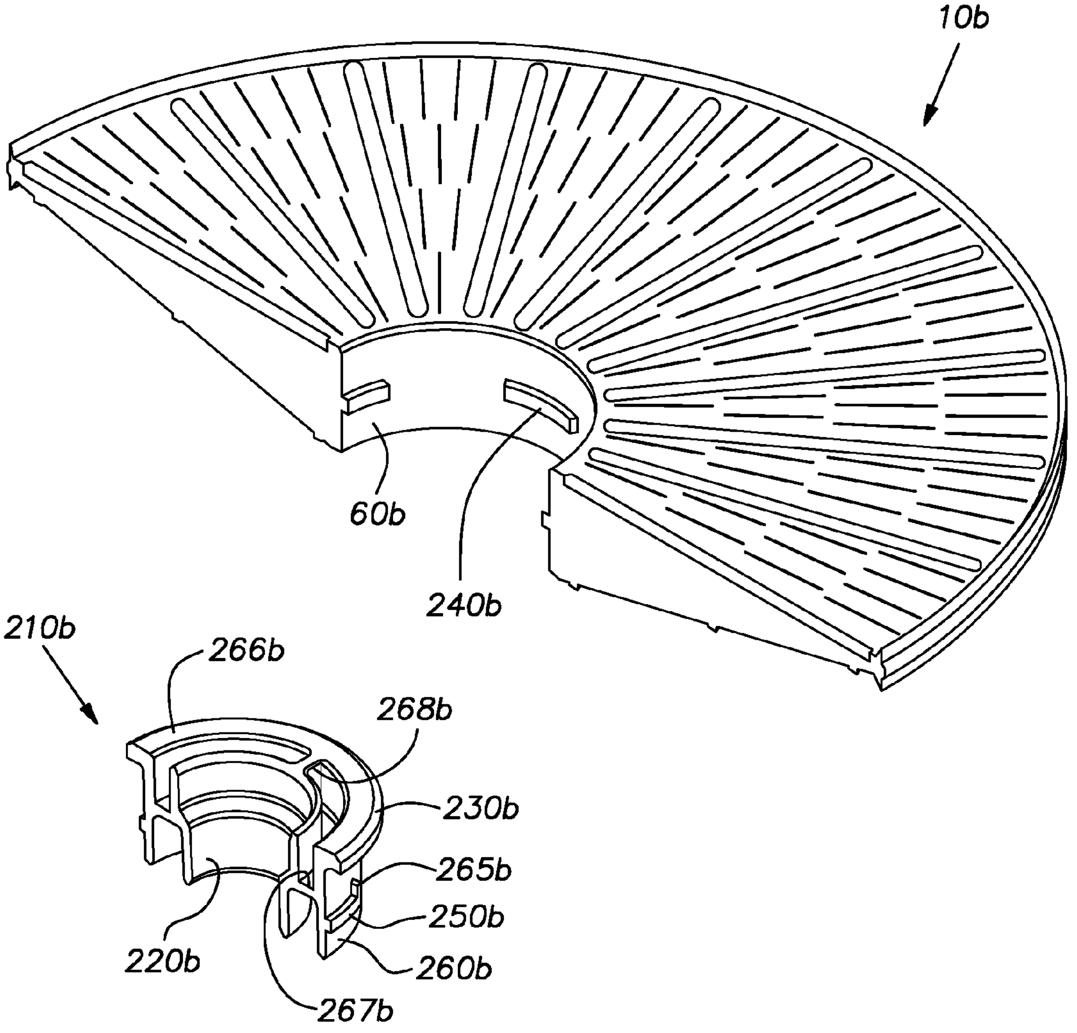
FIG. 5 is an exploded perspective front section view taken through the center of one exemplary access plate and corresponding second distributor plate according to the present invention.

FIG. 5 shows an exploded perspective front section view taken through the center of an exemplary access plate 210*b* and corresponding second distributor plate 10*b* according to the present invention. The access plate 210*b* includes an axial opening 220*b* that is dimensioned to sealingly surround the supply pipe 170 (shown in FIG. 7) and an outer perimeter portion 230*b* that is adapted to cover and thereby close off the gap or open space between the supply pipe 170 and the central opening 60*b* in the second distributor plate 10*b* through which the water treatment media can pass during a filling operation.

In the embodiment illustrated in FIG. 5, the second distributor plate 10*b* includes a plurality of discontinuous raised thread sections 240*b* disposed in the central opening 60*b*. The raised thread sections 240*b* preferably lie in a plane that is parallel to the top side 30*b* of the second distributor plate 10*b* and bisects the height of the collar. The access plate 210*b* also includes a plurality of discontinuous raised thread sections 250*b*, which extend from an outer portion 260*b* of access plate 210*b*. The discontinuous thread sections 250*b* formed on the access plate 210*b* are adapted to pass between and slightly past the discontinuous thread sections 240*b* formed on the second distributor plate 10*b*. Rotation of the access plate 210*b* relative to the second distributor plate 10*b* causes the raised thread sections 250*b* to pass over the raised thread sections 240*b*, thereby locking the access plate 210*b* to the second distributor plate 10*b*. A stop 265*b* can be formed on the raised thread sections 250*b* (or the 240*b*) to limit rotation of the access plate 210*b* with respect to the second distributor plate 10*b*.

A top portion 266*b* of the access plate 210*b* preferably defines an annular channel 267*b*, which is interrupted by vertical segments 268*b*. This structure facilitates locking the access plate 210*b* to the second distributor plate 10*b* through the use of a tool (not shown) having prongs that extend into the annular channel 267*b*.

In the embodiment shown in FIG. 5, the central opening 60*b* in the second distributor plate 10*b* is relatively large in diameter. Accordingly, the access plate 210*b* is also correspondingly large in diameter. To strengthen the access plate 210*b*, a double-wall construction can be utilized, with an inner wall defining the axial opening 220*b* and the outer wall defining the outer portion 260*b* of the second access plate 210*b*.

Figure 6:
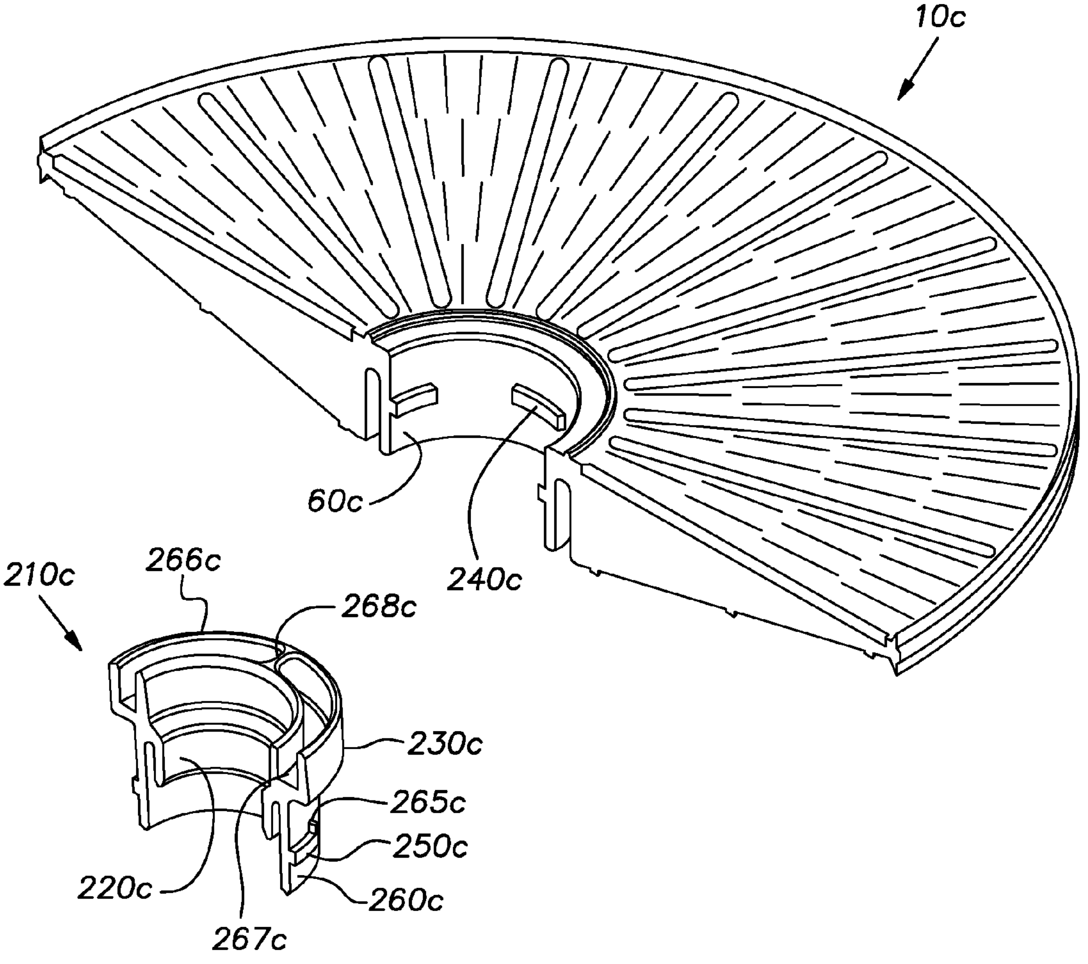
FIG. 6 is an exploded perspective front section view taken through the center of another exemplary access plate and corresponding second distributor plate according to the present invention.

FIG. 6 shows an exploded perspective front section view taken through the center of an alternative embodiment of an access plate 210*c* and corresponding second distributor plate 10*c* according to the present invention. Like reference numbers are used to identify similar elements ("c" is used instead of "b"). In the embodiment shown in FIG. 6, the central opening 60*c* in the second distributor plate 10*c* is smaller in diameter than the central opening 60*b* in the second distributor plate 10*b* shown in FIG. 5, but larger than the diameter of the supply pipe 170. Access plate 210*c* can pass through the central opening 60*b* in second distributor plate 10*b*. However, the top portion 266*c* of the access plate 210*c* preferably defines an annular channel 267*c* interrupted by vertical segments 268*c* that is the same size as the annular channel 267*b* in the access plate 210*b* shown in FIG. 5. Thus, the same tool used to lock access plate 210*b* to second distributor plate 10*b* can be used to lock access plate 210*c* to second distributor plate 10*c*.

The perimeter edge of second distributor plates 10*b*, 10*c* (etc.) preferably has a flat profile in cross-section to maximize the contact between the perimeter edge and the inner side wall 200 of the thermoplastic cylinder during spin-welding. In some instances, small bumps may be provided on the perimeter edge in a spaced apart relationship to facilitate sliding the second distributor plates 10*b*, 10*c* through the thermoplastic cylinder 130 to the desired installation position. The small bumps rapidly heat up, melt and become part of the melt-fusion bond between the perimeter edge of the additional distributor plates 10*b*, 10*c* and the inner side wall 200 of the thermoplastic cylinder 130 during spin-welding.

The distributor plates are preferably formed of a thermoplastic polymer that is suitable for spin-welding applications. Olefin polymers such as polypropylene, polyethylene and particularly copolymers thereof are preferred for use in the invention. The snap-fitting 160 and/or the access plate(s) 210 can also be formed of the same material, but can also be formed of other corrosion resistant polymeric materials, if desired.

FIG. 7 shows a cross-section view of an exemplary water treatment vessel 270*a* according to the invention. The water treatment vessel 270*a* comprises a thermoplastic liner 280 in the form of a thermoplastic cylinder 130 having a first thermoplastic domed end cap 120 spin-welded to a first end thereof and a second thermoplastic domed end cap 290 spin-welded to a second end thereof. A reinforcing layer 300 covers the thermoplastic liner 280. The reinforcing layer 300 comprises a plurality of glass filaments that are wrapped helically and circumferentially around the thermoplastic liner. The glass filaments are preferably coated with a thermosetting epoxy resin composition. The thermosetting epoxy resin composition consolidates the glass filaments and bonds the same to the thermoplastic liner when cured.

A first distributor plate 10*a* is spin-welded to the first domed end cap 120 of the thermoplastic liner 280 before the end cap 120 is spin-welded to the thermoplastic cylinder 130. The first distributor plate 10*a* comprises a thermoplastic polymeric disk having a top side, a bottom side, a perimeter edge and a central opening. A plurality of radial slits are formed in the disk to define fluid flow passages through the disk between the central opening and the perimeter edge. The fluid flow passages through the disk are adapted to swirl fluid flowing through the disk from the bottom side to the top side around the central opening. The fluid flow is shown by arrows 80.

The water treatment vessel 270*a* according to the invention further comprises a supply pipe 170 having a snap-fitting 160 attached at a first end thereof, wherein the snap-fitting 160 engages with and is thereby retained by an upper retaining ring formed in the central opening in the first distributor plate. A second end 310 of the supply pipe 170 is accessible through an aperture 320 formed in the second domed end cap 290. The second end 310 of the supply pipe 170 can be connected to a valve assembly (not shown), which includes means for directing water into the vessel to flow through the water treatment media and distributor plate(s) and then up through the supply pipe 170.

In a preferred embodiment of the invention, the water treatment vessel further comprises one or more second distributor plates 10*b*, 10*c*. Each one of the second distributor plates preferably comprises a second thermoplastic disk having top side, a bottom side, a central opening and a perimeter edge that is spin-welded to the cylindrical side wall of the thermoplastic liner. As in the case of the first distributor plate, a plurality of radial slits are formed in the second disk to define fluid flow passages through the second disk between the central opening and the perimeter edge. The fluid flow passages through the second disk are adapted to swirl fluid flowing through the second disk from the bottom side to the top side about the central opening. The fluid flow can be in the same direction as the fluid flow from the first distributor plate, or can be counter to the flow. To facilitate the passage of water treatment media past the second distributor plate, the central opening in the second disk has a larger diameter than the outer diameter of the supply pipe. The gap or open space between the central opening in the second disk and the supply pipe is closed off using an access plate that is smaller in diameter than the aperture formed in the second domed end cap. The access plate includes an axial opening that is dimensioned to sealingly surround the supply pipe and a perimeter edge that is adapted to removable engage with the central opening in the second disk and thereby close off the gap or space. Thus, a first water treatment media is supported by the first distributor plate and a second water treatment media is supported by the second distributor plate. The media can be the same or different materials.

Figure 8:
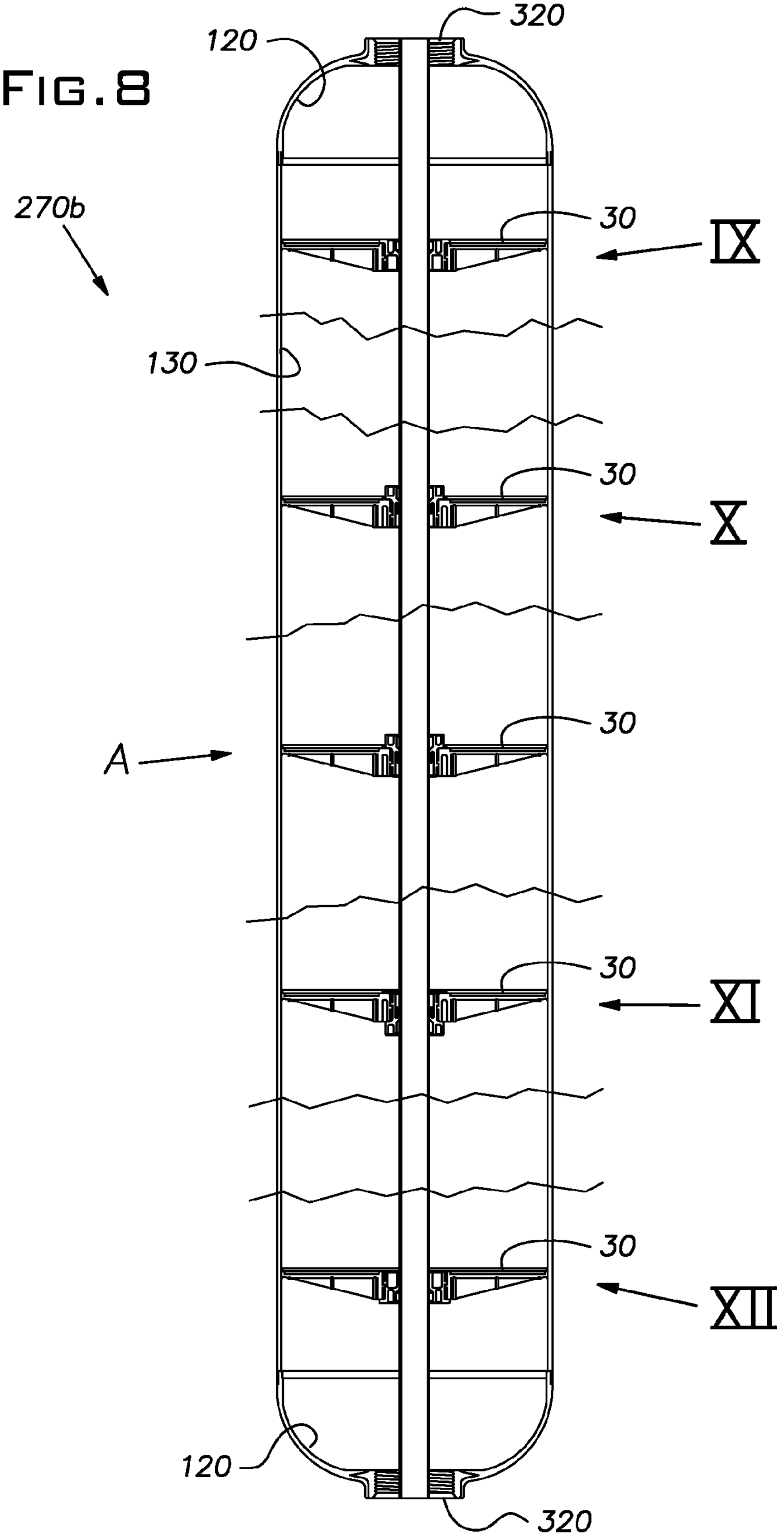
FIG. 8 is a front section view taken through the longitudinal axis of yet another exemplary composite pressure vessel according to the invention.
Figure 9:
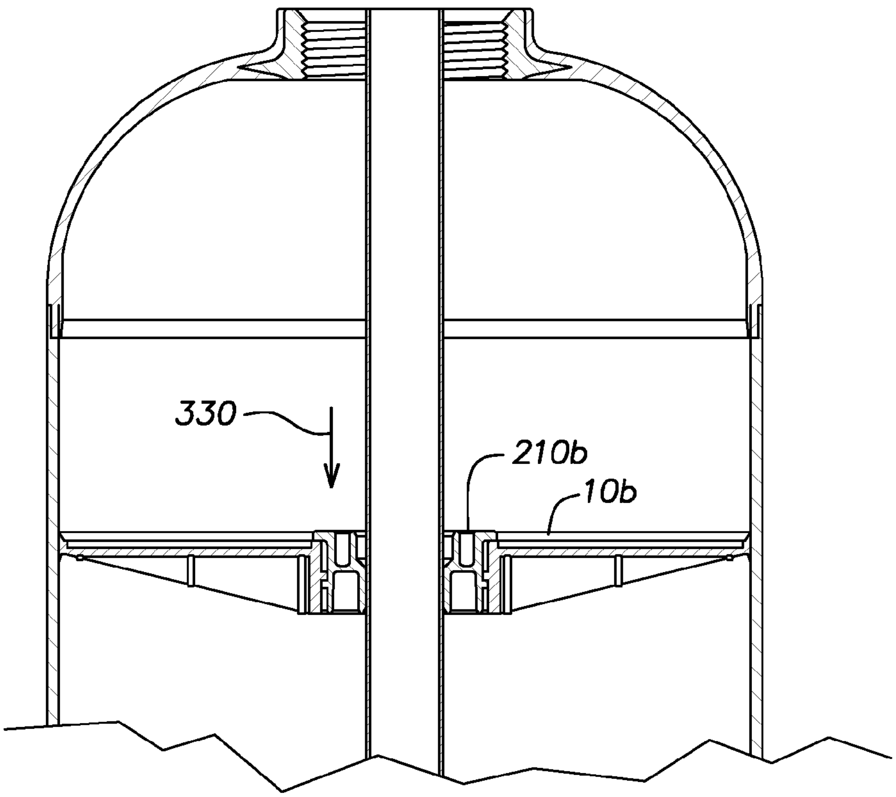
FIGS. 9-12 show portions of the composite pressure vessel shown in FIG. 8.
Figure 10:
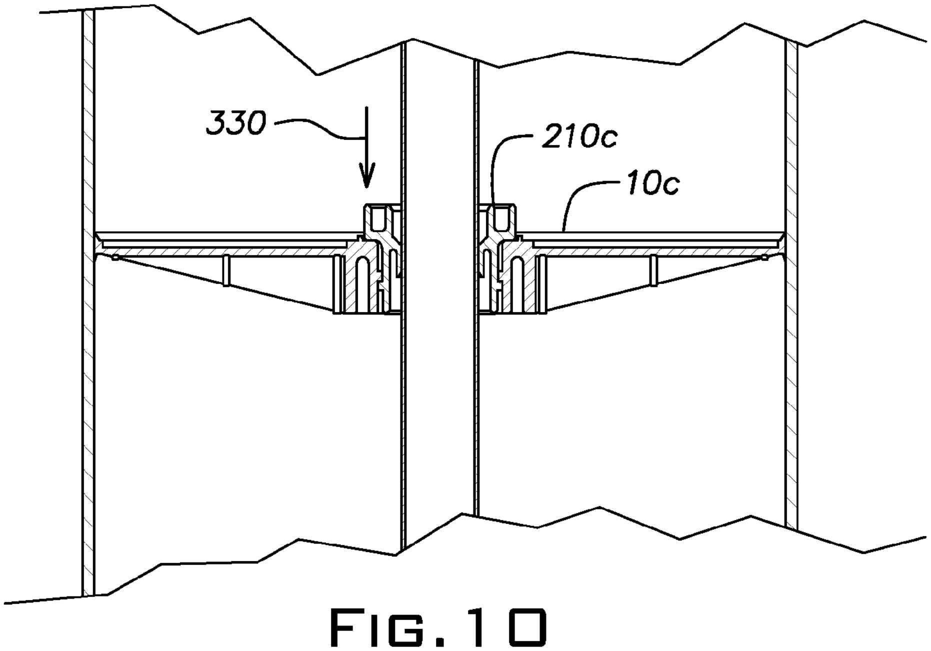
Figure 11:
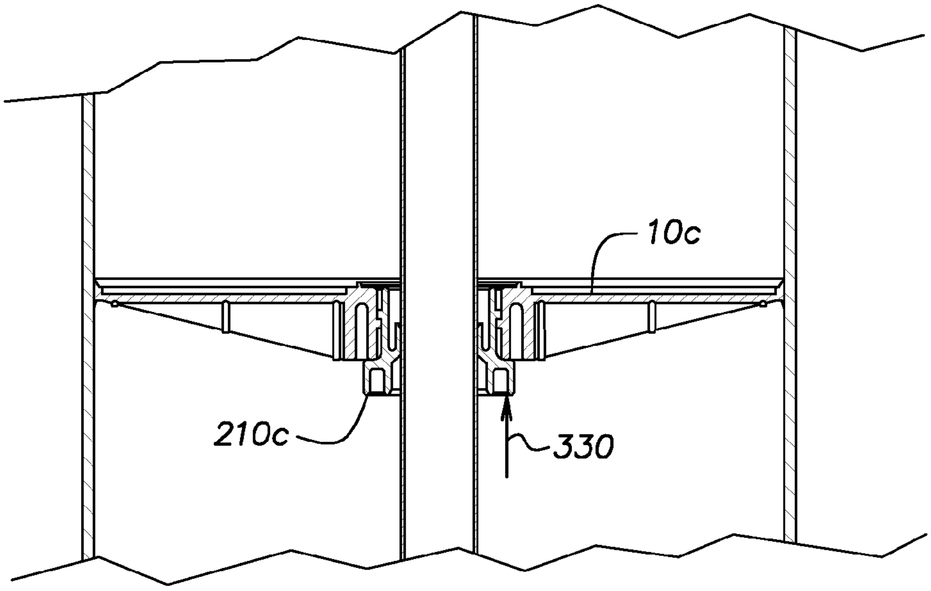
Figure 12:
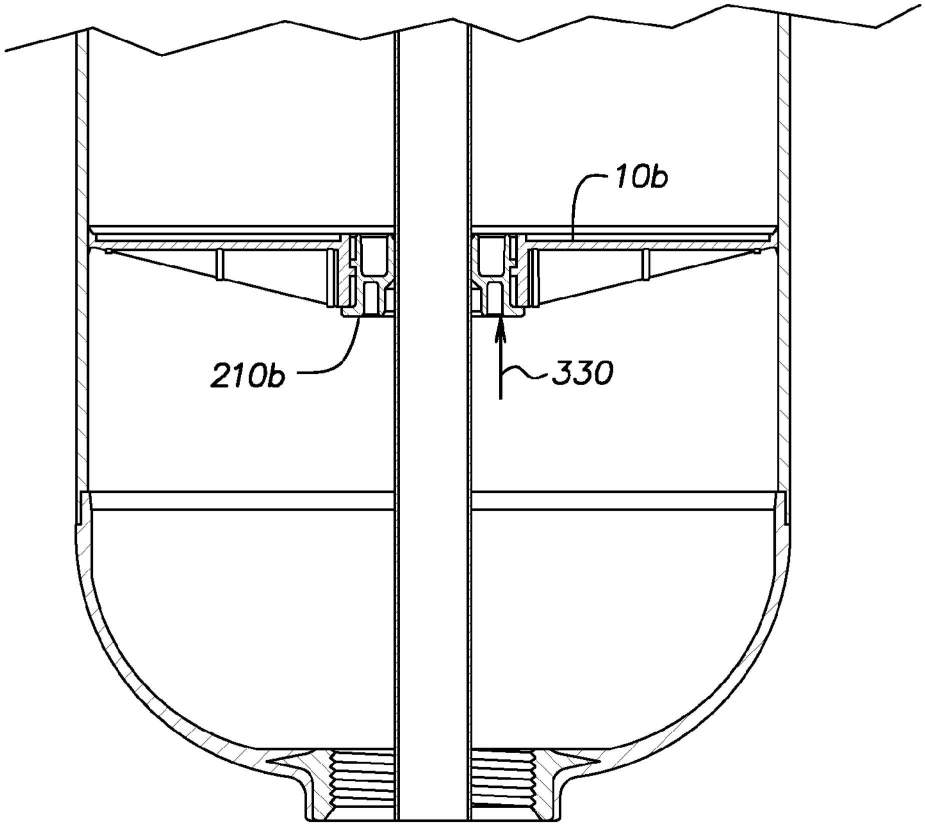

FIG. 8 shows a front section view taken through the longitudinal axis of yet another exemplary composite pressure vessel 270*b* according to the invention. FIGS. 9-12 show portions of the composite pressure vessel 270*b* shown in FIG. 8, where Roman numerals IX, X, XI and XII designate the portion of the composite pressure vessel 270*b* shown in FIGS. 9-12, respectively.

The composite pressure vessel 270*b* shown in FIG. 8 does not include a first distributor plate 10*a*. However, the composite pressure vessel includes a total of five second distributor plates 10*b*, 10*c*. The arrow adjacent to reference symbol A in FIG. 8 points to a second distributor plate 10*c* and corresponding access plate 210*c*. During fabrication of composite pressure vessel 270*b*, the second distributor plate 10*c* and corresponding access plate 210*c* indicated by reference symbol A are locked together before second distributor plates 10*c* (X) is bonded to the thermoplastic liner 130. Once the domed end caps 120 have been spin-welded to the thermoplastic liner 130, water treatment media can be inserted through the apertures 320 on each domed end cap 120 to fill compartments defined by the second distributor plates 10*b*, 10*c*. The composite pressure vessel 270*b* shown in FIG. 8 includes four internal compartments, each of which can be used to retain a separate and distinct water treatment media. The second distributor plates 10*b*, 10*c* are all spin-welded to the thermoplastic liner 130 such that their top sides 30 are all oriented in the same direction. However, the access plates 210*b*, 210*c* are inserted from opposite directions indicated by arrow 330.

The present invention also provides a method for manufacturing a composite pressure vessel. In accordance with the method, a first thermoplastic distributor plate is spin-welded to a first thermoplastic domed end cap. The first distributor plate comprises a thermoplastic polymeric disk having a top side, a bottom side, a perimeter edge and a central opening. Radial slits are formed in the disk to define fluid flow passages through the disk between the central opening and the perimeter edge. The fluid flow passages through the disk are adapted to swirl fluid flowing through the disk from the bottom side to the top side around the central opening. Drive lugs are preferably formed in the top side of the first distributor plate, which receive fins extending from a chuck plate attached to a spin-welding machine. Rotation of the chuck plate rapidly spins the first distributor plate temporarily while the perimeter edge thereof is frictionally contacting the inner surface of the first domed end cap. The friction creates local heating, which melt-fuses the two parts together. The perimeter of the first distributor plate is completely fused to the inner side of the first thermoplastic end cap. Once the first distributor plate has been spin-welded to the first domed end cap, the first domed end cap is spin welded to a first end of the thermoplastic cylinder, and a second thermoplastic domed end cap is spin-welded to a second end of the thermoplastic cylinder to form a thermoplastic liner assembly. The thermoplastic liner assembly is then be wrapped with a reinforcing overwrap layer comprising glass filaments, which are preferably coated with a thermosetting epoxy composition. The glass filaments are wrapped helically and circumferentially around the thermoplastic liner assembly. After the thermosetting epoxy composition has been cured, a supply pipe having a snap fitting attached at a first end thereof is inserted through an aperture formed in the second domed end cap until the snap fitting engages with and is retained by an upper retaining ring formed in the central opening of the first distributor plate.

In some instances, it will be advantageous for one or more second distributor plates to be installed within the composite pressure vessel. This can be accomplished by spin-welding one or more second distributor plates to a cylindrical side wall of the thermoplastic cylinder before the first domed end cap is spin welded to the first end thereof. The thermoplastic cylinder is held stationary, and the second distributor plates are temporarily, rapidly spun while their perimeter edges are in frictional contact with the inner side walls of the thermoplastic cylinder. The second distributor plate preferably comprises a second disk having top side, a bottom side, a central opening and the perimeter edge that is spin-welded to the cylindrical side wall of the thermoplastic cylinder. The second distributor plate preferably includes a plurality of radial slits that define fluid flow passages through the second disk between the central opening and the perimeter edge. As in the case of the first distributor plate, the fluid flow passages through the second disk are adapted to swirl fluid flowing through the second disk from the bottom side to the top side about the central opening.

The present invention also provides a method for preparing a composite pressure vessel for use as a water treatment apparatus. In accordance with the method, a composite pressure vessel comprising a thermoplastic liner comprising a thermoplastic cylinder having a first thermoplastic domed end cap spin-welded to a first end thereof and a second thermoplastic domed end cap spin-welded to a second end thereof is provided. The thermoplastic liner is covered by a reinforcing layer, which comprising a plurality of glass filaments wrapped helically and circumferentially around the thermoplastic liner. The composite pressure vessel includes at least a first distributor plate comprising a first thermoplastic polymeric disk having a top side, a bottom side, a central opening and a perimeter edge that has been spin-welded to the first domed end cap of the thermoplastic liner. The first distributor plate includes a plurality of radial slits, which define fluid flow passages through the first disk between the central opening and the perimeter edge. The fluid flow passages through the first disk are adapted to swirl fluid flowing through the first disk from the bottom side to the top side around the central opening. The composite pressure vessel also includes a supply pipe having a snap-fitting attached at a first end thereof. The snap-fitting is engaged with and is thereby retained by an upper retaining ring formed in the central opening in the first disk. A second end of the supply pipe is accessible through an aperture formed in the second domed end cap. In accordance with the method, a first water treatment media is disposed through the aperture in the second domed end cap into the composite pressure vessel such that the first water treatment media is supported by the first distributor plate.

In a preferred embodiment, the composite pressure vessel includes one or more second distributor plates comprising a second disk having top side, a bottom side, a central opening and a perimeter edge that have been spin-welded to the cylindrical side wall of the thermoplastic liner. As in the case of the first distributor plate, a plurality of radial slits are formed in the second disk to define fluid flow passages through the second disk between the central opening and the perimeter edge. The fluid flow passages through the second disk are adapted to swirl fluid flowing through the second disk from the bottom side to the top side about the central opening. The central opening in the second disk has a larger diameter than the outer diameter of the supply pipe, thereby leaving a gap or open space between the central opening and the supply pipe. The water treatment media is introduced into the vessel such that it passes through the gap or open space and is supported on the first distributor plate. Then, an access plate that is smaller in diameter than the aperture formed in the second domed end cap is slid over the supply pipe such that an axial opening in the access plate sealingly surrounds the supply pipe. The access plate is slid down the supply pipe until a perimeter edge of the access plate covers or removably engages with the central opening in the second disk, closing off the gap or open space. A second water treatment media is then disposed through the aperture in the second domed end cap into the composite pressure vessel such that the second water treatment media is supported by the second distributor plate.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A water treatment vessel comprising:

a thermoplastic liner having an inner volume;

a reinforcing layer covering the thermoplastic liner, the reinforcing layer comprising a plurality of glass filaments wrapped helically and circumferentially around the thermoplastic liner; and a first distributor plate comprising a first thermoplastic polymeric disk having a top side, a bottom side, a central opening and a perimeter edge that is joined to an inner side of the thermoplastic liner to divide the inner volume of the thermoplastic liner into at least a first compartment and a second compartment;

wherein a plurality of slits are formed in the first disk to define fluid flow passages through the first disk between the central opening and the perimeter edge, wherein the fluid flow passages through the first disk are narrower at the top side of the first disk than at the bottom side of the first disk, wherein the fluid flow passages through the first disk are each bounded by a first longitudinal sidewall that is substantially planar and a second longitudinal sidewall that includes a concave portion that faces the first longitudinal sidewall, and wherein the fluid flow passages through the first disk are adapted to swirl liquid flowing through the first disk from the bottom side to the top side around the central opening.

2. The water treatment vessel according to claim 1 further comprising a supply pipe having a snap-fitting attached at a first end thereof, wherein the snap-fitting engages with and is thereby retained by an upper retaining ring formed in the central opening in the first disk, and wherein a second end of the supply pipe is accessible through an aperture formed in the thermoplastic liner.

3. The water treatment vessel according to claim 2 further comprising a second distributor plate comprising a second thermoplastic polymeric disk having top side, a bottom side, a central opening and a perimeter edge that is joined to the inner side of the thermoplastic liner to further divide the inner volume of the thermoplastic liner into at least a third compartment, wherein a plurality of slits are formed in the second disk to define fluid flow passages through the second disk between the central opening and the perimeter edge, wherein the fluid flow passages through the second disk are narrower at the top side of the second disk than at the bottom side of the second disk, wherein the fluid flow passages through the second disk are adapted to swirl liquid flowing through the second disk from the bottom side to the top side around the central opening in the second disk, and wherein a diameter of the central opening in the second disk is larger than a diameter of the supply pipe.

4. The water treatment vessel according to claim 3 further comprising an access plate that is smaller in diameter than the aperture formed in the thermoplastic liner, wherein the access plate includes an axial opening that is dimensioned to sealingly surround the supply pipe and a perimeter portion that is adapted to close off a space between the supply pipe and the central opening in the second disk.

5. The water treatment vessel according to claim 4 wherein a first water treatment media is supported by the first distributor plate and a second water treatment media is supported by the second distributor plate.

6. The water treatment vessel according to claim 1 wherein the slits in the first distributor plate radiate from the central opening in the first disk and are arranged in a plurality of concentric rings.

7. The water treatment vessel according to claim 1 wherein the central opening in the first distributor plate includes an upper retaining ring for engaging a snap-fitting attached to an end of a supply pipe.

8. The water treatment vessel according to claim 1 wherein the first longitudinal sidewall is substantially perpendicular to the top side of the first disk.

9. The water treatment vessel according to claim 1 wherein the thermoplastic liner comprises a thermoplastic cylinder having a first end and a second end, a first thermoplastic domed end cap spin-welded to the first end of the thermoplastic cylinder and a second thermoplastic domed end cap spin-welded to the second end of the thermoplastic cylinder.

10. The water treatment vessel according to claim 1 wherein the perimeter edge of the first disk is spin-welded to the thermoplastic cylinder.

11. A water treatment vessel comprising:

a thermoplastic liner having an inner volume;

a reinforcing layer covering the thermoplastic liner, the reinforcing layer comprising a plurality of glass filaments wrapped helically and circumferentially around the thermoplastic liner; and a first distributor plate comprising a first thermoplastic polymeric disk having a top side, a bottom side, a central opening and a perimeter edge that is joined to an inner side of the thermoplastic liner to divide the inner volume of the thermoplastic liner into at least a first compartment and a second compartment;

wherein a plurality of slits are formed in the first disk to define fluid flow passages through the first disk between the central opening and the perimeter edge, wherein the fluid flow passages through the first disk are bounded by a first longitudinal sidewall and a second longitudinal sidewall, wherein the first longitudinal sidewall is substantially perpendicular to the top side of the first disk and wherein the second longitudinal sidewall includes a concave portion that faces the first longitudinal sidewall, and wherein the fluid flow passages through the first disk are adapted to swirl liquid flowing through the first disk from the bottom side to the top side around the central opening.

12. The water treatment vessel according to claim 11 further comprising a supply pipe having a snap-fitting attached at a first end thereof, wherein the snap-fitting engages with and is thereby retained by an upper retaining ring formed in the central opening in the first disk, and wherein a second end of the supply pipe is accessible through an aperture formed in the thermoplastic liner.

13. The water treatment vessel according to claim 12 further comprising a second distributor plate comprising a second thermoplastic polymeric disk having top side, a bottom side, a central opening and a perimeter edge that is joined to the inner side of the thermoplastic liner to further divide the inner volume of the thermoplastic liner into at least a third compartment, wherein a plurality of slits are formed in the second disk to define fluid flow passages through the second disk between the central opening and the perimeter edge, wherein the fluid flow passages through the second disk are narrower at the top side of the second disk than at the bottom side of the second disk, wherein the fluid flow passages through the second disk are adapted to swirl liquid flowing through the second disk from the bottom side to the top side around the central opening in the second disk, and wherein a diameter of the central opening in the second disk is larger than a diameter of the supply pipe.

14. The water treatment vessel according to claim 13 further comprising an access plate that is smaller in diameter than the aperture formed in the thermoplastic liner, wherein the access plate includes an axial opening that is dimensioned to sealingly surround the supply pipe and a perimeter portion that is adapted to close off a space between the supply pipe and the central opening in the second disk.

15. The water treatment vessel according to claim 14 wherein a first water treatment media is supported by the first distributor plate and a second water treatment media is supported by the second distributor plate.

16. The water treatment vessel according to claim 11 wherein the slits in the first distributor plate radiate from the central opening in the first disk and are arranged in a plurality of concentric rings.

17. The water treatment vessel according to claim 11 wherein the central opening in the first distributor plate includes an upper retaining ring for engaging a snap-fitting attached to an end of a supply pipe.

18. The water treatment vessel according to claim 11 wherein each of the fluid flow passages through the first disk is narrower at the top side of the first disk than at the bottom side of the first disk.

19. The water treatment vessel according to claim 11 wherein the thermoplastic liner comprises a thermoplastic cylinder having a first end and a second end, a first thermoplastic domed end cap spin-welded to the first end of the thermoplastic cylinder and a second thermoplastic domed end cap spin-welded to the second end of the thermoplastic cylinder.

20. The water treatment vessel according to claim 11 wherein the perimeter edge of the first disk is spin-welded to the thermoplastic cylinder.

* * * * *